United States Patent
Jeschke

(10) Patent No.: US 9,767,686 B2
(45) Date of Patent: Sep. 19, 2017

(54) METHOD AND CONTROL AND DETECTION DEVICE FOR DETERMINING THE PLAUSIBILITY OF A WRONG-WAY TRAVEL OF A MOTOR VEHICLE

(71) Applicant: Robert Bosch GmbH, Stuttgart (DE)

(72) Inventor: Christian Jeschke, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/916,903

(22) PCT Filed: Sep. 1, 2014

(86) PCT No.: PCT/EP2014/068463
§ 371 (c)(1),
(2) Date: Mar. 4, 2016

(87) PCT Pub. No.: WO2015/032705
PCT Pub. Date: Mar. 12, 2015

(65) Prior Publication Data
US 2016/0203716 A1    Jul. 14, 2016

(30) Foreign Application Priority Data

Sep. 6, 2013  (DE) ......................... 10 2013 217 833
Nov. 15, 2013  (DE) ......................... 10 2013 223 398
May 8, 2014  (DE) ......................... 10 2014 208 622

(51) Int. Cl.
*G08G 1/056* (2006.01)
*B60W 40/072* (2012.01)
(Continued)

(52) U.S. Cl.
CPC ........... *G08G 1/056* (2013.01); *B60W 40/072* (2013.01); *G01C 21/3697* (2013.01); *G08G 1/166* (2013.01); *G08G 1/167* (2013.01)

(58) Field of Classification Search
CPC ........ G08G 1/056; G08G 1/166; G08G 1/167; B60W 40/072; G01C 21/3697
See application file for complete search history.

(56) References Cited

U.S. PATENT DOCUMENTS 7,869,947 B2 * 1/2011 Schirmer ........... G01C 21/3626
340/988
8,421,648 B2 * 4/2013 Konaka ................ B62D 15/029
340/438

(Continued)

FOREIGN PATENT DOCUMENTS

DE      199 34 774         2/2001
DE    10 2008 017972      10/2009

(Continued)

OTHER PUBLICATIONS

Tao et al., "Wrong Roadway Detection for Multi-lane Roads", Computer Analysis of Images and Patterns (CAIP 2013), Lecture Notes in Computer Science, vol. 8048, Aug. 2013, pp. 50-58.*
Machine-generated English translation of EP 1327968 A2 to Gollweski et al., originally published in German, Jul. 16, 2003, 18 pages.*

*Primary Examiner* — Todd Melton
(74) *Attorney, Agent, or Firm* — Norton Rose Fulbright US LLP; Gerard Messina

(57) ABSTRACT

A method for determining the plausibility of wrong-way travel of a motor vehicle when entering a directional roadway, including detecting at least one curve information item of a current travel path, ascertaining at least one curve information item of a permitted travel path, determining a deviation between the detected and ascertained curve information items, and plausibilizing a wrong-way travel if a deviation exists or a deviation limit value is breached. A control/detection device for determining the plausibility of wrong-way travel when entering a directional roadway, includes an arrangement for detecting at least one curve information item of a current travel path; an arrangement for ascertaining at least one curve information item of a permitted travel path; an arrangement for determining a deviation between detected and ascertained curve information items; and an arrangement for determining the plausibility of (Continued)

wrong-way travel if a deviation exists or a deviation limit value is breached.

15 Claims, 3 Drawing Sheets

(51) Int. Cl.
  *G01C 21/36* (2006.01)
  *G08G 1/16* (2006.01)

(56) References Cited

U.S. PATENT DOCUMENTS

| | | | |
|---|---|---|---|
| 8,754,782 B2* | 6/2014 | Tagawa | G08G 1/075 340/438 |
| 8,965,617 B2* | 2/2015 | Takahara | G01C 21/3697 701/22 |
| 2010/0007523 A1* | 1/2010 | Hatav | G01C 21/26 340/901 |

FOREIGN PATENT DOCUMENTS

| | | |
|---|---|---|
| DE | 10 2012 220138 | 6/2014 |
| EP | 1 327 968 | 7/2003 |
| EP | 1 544 829 | 6/2005 |
| EP | 2 144 213 | 1/2010 |

\* cited by examiner

METHOD AND CONTROL AND DETECTION DEVICE FOR DETERMINING THE PLAUSIBILITY OF A WRONG-WAY TRAVEL OF A MOTOR VEHICLE

FIELD OF THE INVENTION

The present invention relates to a method and a control and detection device for determining the plausibility of a wrong-way travel of a motor vehicle when entering a directional roadway.

BACKGROUND INFORMATION

In case of an accident, wrong-way drivers, also known as ghost drivers, cause deaths, injuries and considerable material damage. Wrong-way travel in this context is understood as driving against the prescribed driving direction on a directional roadway. A directional roadway is a roadway that is structurally separated from oncoming traffic. Directional roadways are found on freeways or expressways such as enlarged German federal highways. Wrong-way travel may be subdivided into forward travel and reverse travel, the forward travel being initiated by a wrong-way entry or by turning around.

Over half of the instances of wrong-way travel begin at connection points of federal freeways. Especially in wrong-way travel on freeways, accidents frequently result in death due to the high driving speeds and the associated high collision speeds.

Detecting wrong-way travel via navigation devices is not always reliably possible, since the information of the navigation device, such as the class and the direction of the road is provided too late in most cases of wrong-way travel, which is to say that the vehicles are then already located in the travel route envelope counter to the driving direction.

Modern motor vehicles use inertial sensors, such as acceleration sensors and yaw-rate sensors, as well as the steering angle to determine the vehicle state, in order to implement safety and comfort systems. In addition, a multitude of motor vehicles these days have an internal GPS module, for example for a navigation system or a position-finding system of the motor vehicle. Already today and in the future, more and more motor vehicles are equipped with video sensor systems, which likewise process and output different items of information such as for example the detection of a display of traffic signs.

SUMMARY OF THE INVENTION

The method according to the present invention for determining the plausibility of a wrong-way travel of a motor vehicle when entering a directional roadway fundamentally includes the following steps:

- detecting at least one item of curve information of a current travel path of the motor vehicle;
- ascertaining at least one item of curve information of a permitted travel path;
- determining a deviation between the detected curve information and the ascertained curve information; and
- determining the plausibility of a wrong-way travel if a deviation exists or a limit value for a deviation is breached.

The method according to the present invention very advantageously allows for the detection of an active chain, which allows for a plausibilization, that is, a check or a preliminary check, as a preparation or component of a detection or recognition of a wrong-way travel. The method according to the present invention may also be regarded and used as a detection of a wrong-way travel. Safety is achieved by detecting data from the surroundings, predicting the travel path or the travel route and/or the steering intention, which increases the reliability and robustness of the method. The present invention is thereby able to detect unintentional wrong-way travel reliably and increase general traffic safety.

The present method specifically looks at the wrong-way travel behavior of a motor vehicle or a motor vehicle driver when entering a roadway or at a connection point since that is where most instances of wrong-way travel arise. Thus it is advantageously possible according to the present invention to plausibilize and/or detect the wrong-way travel already prior to entering the roadway itself.

The curve information may be based on a curve or a change in direction of a road or of an entrance to or an exit from the road. This is distinguished from a change in direction of the vehicle by the driver, which may also be a lane change on a road for example. This increases the robustness of the method since normal driving maneuvers such as a lane change are not taken into consideration for the plausibilization of a wrong-way travel.

A permitted travel path may be a travel path or a route for the motor vehicle that satisfies the traffic regulations such as the Road Traffic Regulations. It may be predicted or regarded as probable for example by a navigation module. In other words, this is the path that the vehicle should take in order to travel correctly.

The individual steps of the method may be executed entirely in the motor vehicle, in an external unit such as a central server, or in parallel and distributed in both systems. The execution of the steps is not bound to the above-mentioned sequence.

In a particular specific embodiment, the curve information includes a radius, a direction and/or a course of the curve. Each individual item of information by itself or in combination may be used as a basis for determining or calculating a deviation of an actual path, that is, the path actually traveled or the curve, with respect to a setpoint path, that is, the ascertained or most probable travel path. In this manner, it is possible to perform the determination quickly and reliably. As a direction, the direction of travel may be in an absolute manner, for example as a cardinal direction, or relatively, for example via a steering angle. In addition to the pure curvature information, the radius may also already include information about the direction of curvature. Thus, for example, a radius of a right-hand curve may have a positive sign, while a left-hand radius then has a negative sign. The course of a curve may be composed for example from multiple (partial) radii and also straight lines. Thus an item of curve information or information about a stretch of path of a connection point may be a signature of a possible or correct path, that is, a path in accordance with regulations.

It may be detected whether the motor vehicle is located in a lane of oncoming traffic. This criterion, which may be detected relatively quickly, may be used either in addition for the plausibilization or as a start criterion for the plausibilization. In both manners, the safety and reliability of the method may be increased. This criterion may be detected by a sensor system, such as a video sensor system for example, or a navigation device or module.

A specific embodiment of the present invention provides for the detection to use at least one sensor of the motor vehicle. Since nowadays various sensors are built into most motor vehicle, these sensors or their signals may be used in a simple manner for the method. The signals may be used directly or indirectly, for example processed or as a basis for derived variables or values. As sensors it is possible to use for example image sensors, including cameras or video cameras, radar sensors, acceleration sensors, wheel sensors, steering-angle sensors, GPS units, but also navigation devices or computing or control units processing these and other data. The use of two sensor types such as for example a navigation module and a video sensor system is particularly advantageous since these two types complement each other. This increases the safety and robustness of the method.

For the purpose of ascertaining an item of curve information of a permitted travel path, it is possible to ascertain first a permitted travel path and subsequently at least one item of permitted curve information of the permitted travel path. This division offers the option of using different units that are best suited for each task. Thus, for example, the permitted travel path may be ascertained by a navigation module and an item of curve information may be detected by a sensor of the vehicle, which may be by the sensor for detecting the current travel path.

The present invention advantageously provides for the use of a navigation system of the motor vehicle to perform the ascertainment. Many motor vehicles are now equipped with a navigation system so that its capacities, particularly the map material, may be utilized. Meanwhile, more and more highly accurate map material is available, with an accuracy in the centimeter range for example. Particularly in cooperation with a more accurate sensor for the near surroundings of the motor vehicle or the area in front of the motor vehicle, such as a video camera or a stereo video camera, is it possible to increase the robustness and reliability of the method and thus the safety of the vehicle and the occupants.

It is also possible for the method to be activated in the area of an entrance to a directional roadway. In this manner, it is possible to suppress false warnings in normal travel, which increases the safety and the acceptance of users.

Furthermore, the ascertainment, determination and/or plausibilization may be performed in a facility external to the motor vehicle. An external facility such as a server of the vehicle manufacturer for example may be used as a reserve or backup system. There may also be a provision for letting the method run exclusively in the external facility, for example if the motor vehicle does not have the necessary sensor system, the map material, or only a portion of these. The communication between the external facility and the server may be established via a mobile radio communication channel.

The present invention provides a control and detection device for determining the plausibility of a wrong-way travel of a motor vehicle when entering a directional roadway, having an arrangement for detecting at least one item of curve information of a current travel path of the motor vehicle; an arrangement for ascertaining at least one item of curve information of a permitted travel path; an arrangement for determining a deviation between the detected item of curve information and the ascertained item of curve information; and an arrangement for determining the plausibility of a wrong-way travel if a deviation exists or when a limit value for a deviation is breached. The same advantages and modifications apply as were described above.

The arrangement for ascertainment, the arrangement for determination and/or the arrangement for plausibilization may include a control system, a control unit or a suitable processing unit and/or a navigation system.

The control and detection device or the arrangement for detection may have a sensor such as an image sensor. An image sensor, such as a camera for individual images or a video camera for film sequences, is able to detect the roadway characteristic such as the direction or inclination well and thus provides a solid foundation for the method.

Furthermore, the motor vehicle or the control and detection device may have at least one inertial sensor. Additionally, for example, the results of the image sensor may be compared with an inertial sensor, that is, an acceleration and/or rate-of-rotation sensor. This increases the reliability and safety of the motor vehicle and its occupants.

Advantageous further developments of the present invention are indicated in the dependent claims and described in the description.

Exemplary embodiments of the present invention are explained in greater detail with reference to the drawings and the following description.

DETAILED DESCRIPTION

Figure 1:
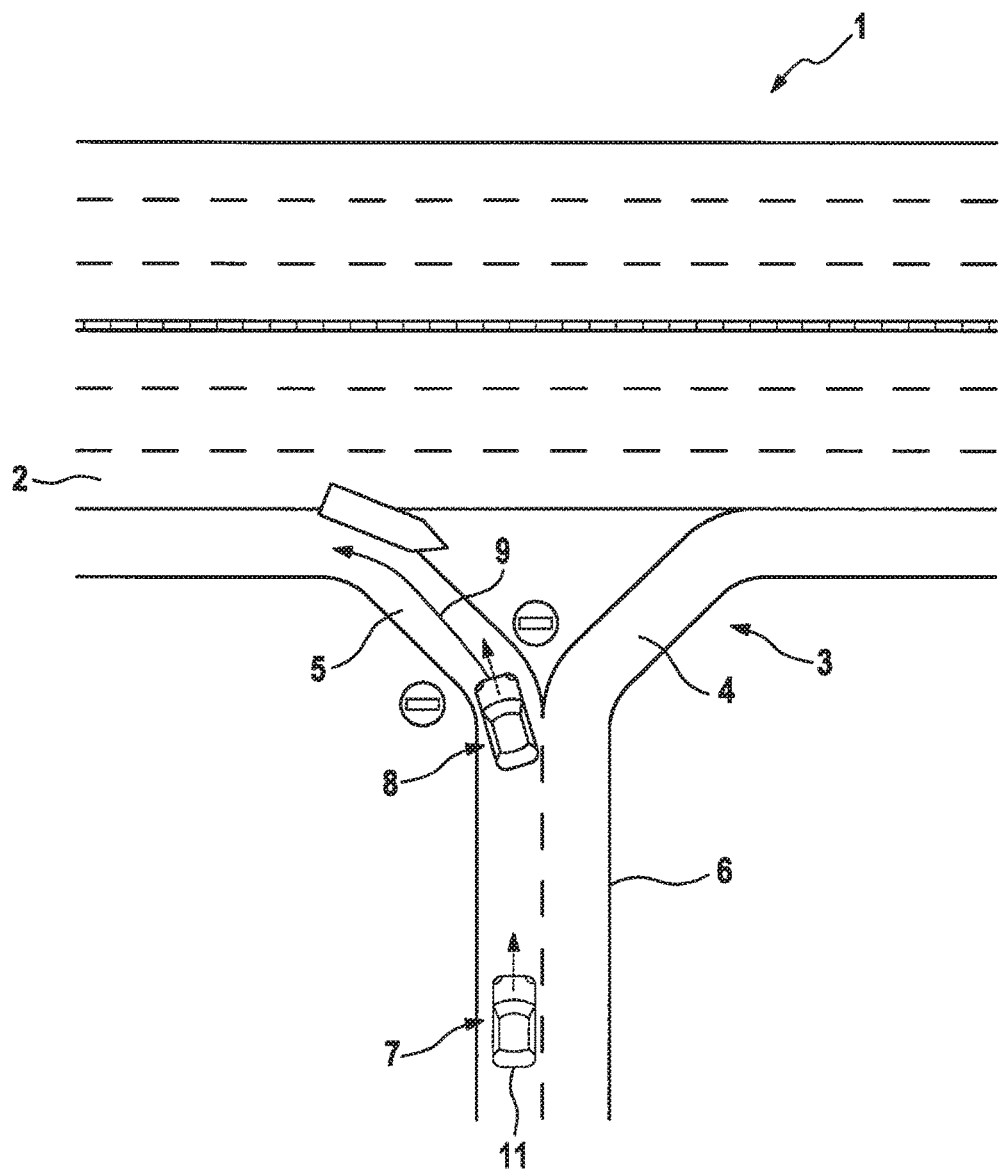
FIG. 1 shows a schematic representation of a connection point of a directional roadway.

FIG. 1 shows a road or expressway 1 having two directional roadways 2 structurally separated from each other as well as a connection point 3. Connection point 3 has an entrance ramp 4 and an exit ramp 5. Starting from a common roadway 6, entrance ramp 4 or the entrance is configured for entering directional roadway 2 of expressway 1, while exit ramp 5 or the exit is configured for leaving directional roadway 2.

A vehicle traveling in the wrong direction or a wrong-way driver 11 is shown in a first position 7 and a second position 8. In first position 7, vehicle 11 is still on roadway 6, which may be regarded as a preparation for a wrong-way travel or already as a wrong-way travel. At position 8, vehicle 11 has already turned into exit ramp 5, which is structurally separated from entrance ramp 4. Motor vehicle 11 is thus already on a directional roadway and is thus engaged in wrong-way travel.

The term vehicle or motor vehicle is here understood as all powered means of transport such as for example passenger cars, trucks, buses, motorcycles etc.

The current travel path or trajectory 9 of vehicle 11 is shown based on the current position of vehicle 11 as well as on additional parameters such as for example the speed, the steering angle or the acceleration. The term current travel path may include the current position and/or the current state of vehicle 11, the distance traveled so far and/or the distance probably to be traveled in the near future. The distance to be traveled in the future may be defined for example by the detecting range of a sensor, by a fixed value in meters such as for example between 0 and 50 meters, which may be between 0 and 20 meters, or by a value dependent on the speed such as for example the braking distance to a standstill.

Figure 2:
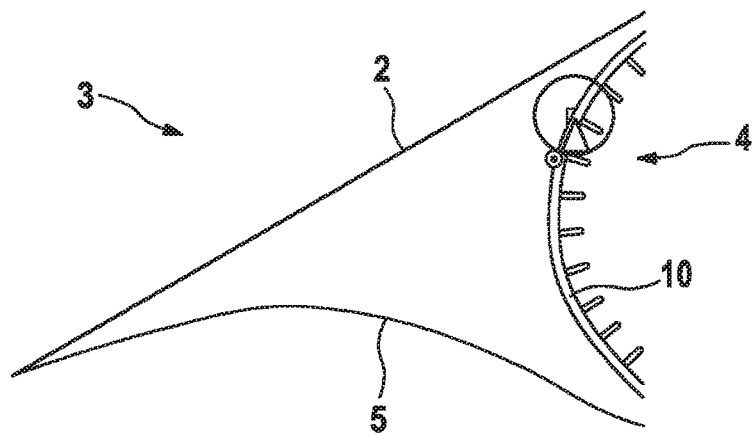
FIG. 2 shows a schematic representation of highly accurate map information of a connection point.

FIG. 2 shows in exemplary fashion a detail of highly accurate map information from a navigation module, which shows expressway connection point 3 from FIG. 1 or a similar connection point. Directional roadway 2, entrance 4 and exit 5 are shown. Entrance ramp 4 is shown having a permitted or most probable travel path 10 superimposed. The most probable travel path 10 is the path calculated by the navigation device or navigation module of the motor vehicle. The calculation is guided by the correct routing, that is, the routing allowed by the Road Traffic Regulations (StVO). For the area of a connection point 3, this means concretely that the navigation system selects the travel path along entrance ramp 4.

Figure 3:
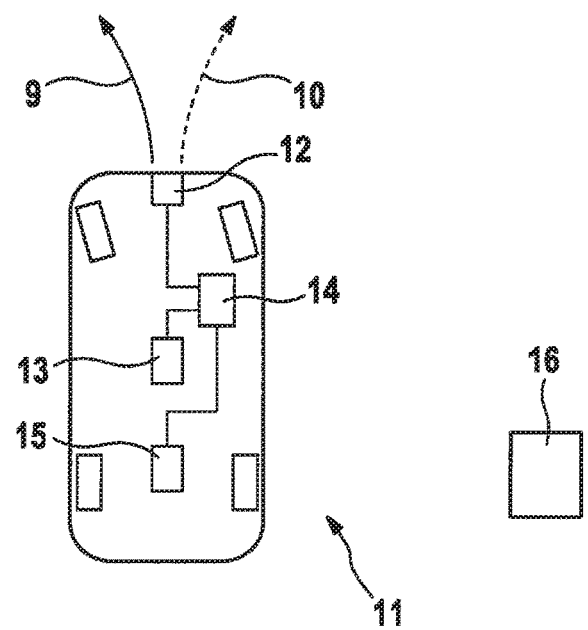
FIG. 3 shows a schematic representation of a motor vehicle having a control and detection device.

FIG. 3 schematically shows a motor vehicle 11 having a control and detection device for determining the plausibility of a wrong-way travel of motor vehicle 11 when entering directional roadway 2, the motor vehicle corresponding for example to wrong-way driver 11 from FIG. 1. The actual travel path 9 of motor vehicle 11 is accordingly shown as well as, by a dashed line, the permitted travel path 10. Motor vehicle 11 or the control and detection device includes at least one sensor 12, which is represented here by way of example for a plurality of sensors. Sensor 12 may be for example an image sensor, a radar sensor, an acceleration sensor, a wheel sensor, a steering angle sensor, a GPS device or the like. Motor vehicle 11 or the control and detection device includes furthermore a navigation device 13 and a control unit 14. Control unit 14 communicates with sensor 12 and navigation device 13, in a wired or wireless manner. The control unit is also connected to a communication interface 15, which is configured to communicate with an external facility 16 such as a central server.

Sensor 12, navigation device 13, control unit 14 and communication interface 15 may be developed, as shown here, as independent units, or they may be integrated in one or multiple units. It is not required, in particular, that each component be executed as hardware, rather individual functions may be implemented as software routines or programs.

Via communications interface 15, information such as map data and/or functionalities such as access to programs of external facility 16 may be provided to motor vehicle 11 or the control and detection device.

Figure 4:
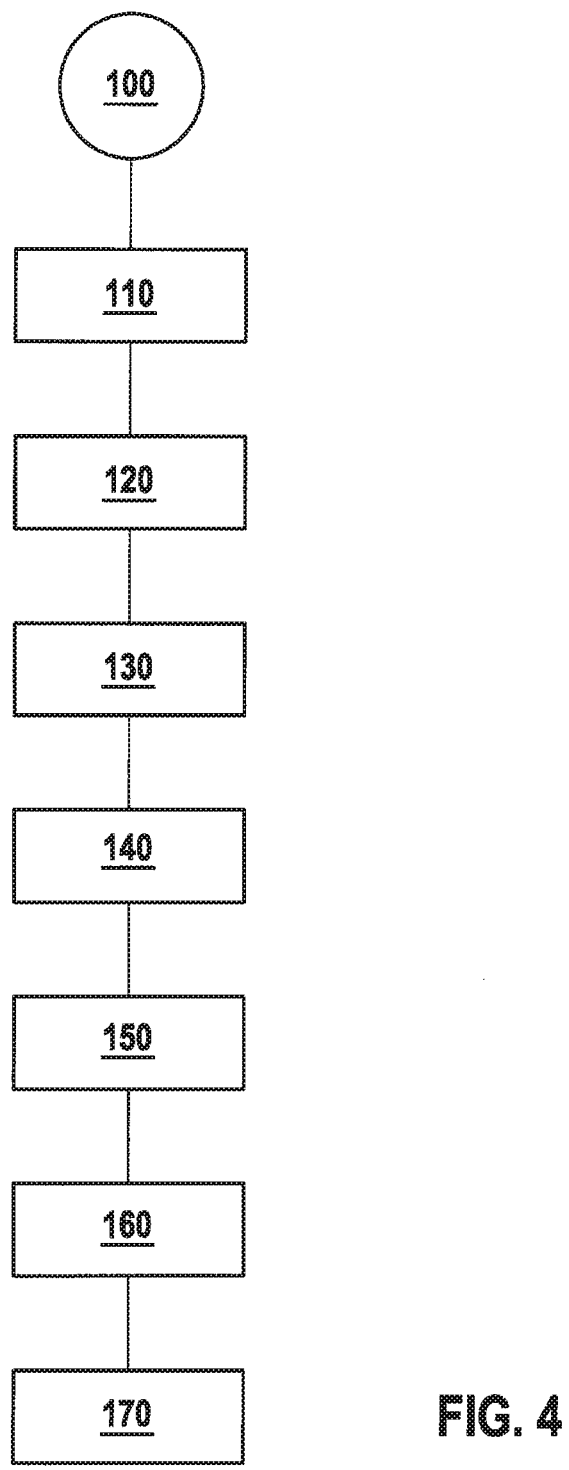
FIG. 4 shows a method for determining the plausibility of a wrong-way travel of a motor vehicle, in the form of a flow chart.

On the basis of FIG. 4, in a combined view with FIGS. 1 through 3, a method is described for determining the plausibility of a wrong-way travel of a motor vehicle 11 is now described.

In a first optional step 100, a check is performed to determine whether motor vehicle 11 is located in the area of a connection point 3. The term area includes both the immediate area of connection point 3 as well as the approach to or the near surrounding of connection point 3.

If this is the case, a step 110 performs a check or detects whether motor vehicle 11 is wrongly located in the lane of oncoming traffic. This is shown in FIG. 1 in first position 7. This detection may occur for example once, as at first position 7, or may be repeated during the method.

In another step 120, at least one item of curve information of the actual travel path 9 of motor vehicle 11 is detected. This detection may begin already at first position 7; at the latest, however, in the area of or at second position 8. This detection is based on sensor system 12 and/or navigation system 13 of motor vehicle 11. Additionally or alternatively, the curve information of current travel path 9 may be detected by an external system, for example a GPS transmitter/receiver. Current travel path 9 may be composed of stored information about the travel path traveled so far, of current state data of the current vehicle position as well as of predictive data, for example of sensors 12, about the future path such as the course of the road in particular of a curve of the road, for example in the visual range of a video sensor.

In this example, the curve information includes the image and/or video information about the area of exit ramp 5 in front of motor vehicle 11, in particular of the course of the roadway such as the direction of the curve and the radius of the curve. This information may be further supplemented or plauzibilized by additional sensor information such as for example from an inertial sensor system or navigation system 13.

In another step 130, the permitted and thus for navigation system 13 most probable travel path 10 for the motor vehicle on a correct or permitted roadway, that is, in this case entrance ramp 4, is ascertained. This ascertainment by navigation system 13 is shown in FIG. 2. The correct roadway allows vehicle 12 to travel without violating traffic rules. Subsequently, in the same step, at least one item of curve information of this permitted travel path is ascertained. This may be already stored for the permitted travel path for example, or it is extracted or calculated. It may also be provided that for certain roads or road types or connecting points, permitted curve information is stored directly so that a permitted travel path does not first have to be ascertained.

In the following step 140, a deviation is determined between the detected curve information, that is, the curve information of current travel path 9, and the curve information of the permitted travel path 10. The curve information of permitted travel path 10 may be either stored directly in the map information of navigation system 13 or it may be calculated from the permitted travel path 10. This calculation may then be performed either by navigation system 13 or by control unit 14. The terms curve information and curve radius may include the radius or course of the entire curve or a radius or course of a certain subsection of the curve. The deviation may be determined as a difference or for example as a setpoint-actual comparison.

In step 150, a wrong-way travel is plausibilized if a deviation exists according to step 140 or if a limit value for a deviation is breached. As described previously, it is possible to detect and process multiple items of curve information such as for example the radius, the inclination and/or direction. Accordingly, it is also possible to determine multiple deviations for each item or multiple items of curve information and to consider these for the plausibilization. A plausibilization may then be performed on the basis of all deviations, a single deviation or multiple deviations. The equivalent applies to limit values for a deviation, which may be provided in order for example to allow for a certain lag or tolerance of the system. This may be helpful for example in order to tolerate a small or brief deviation from the permitted or most probably travel path.

If the plausibilization, that is, the evaluation or verification, of the items of information yields the conclusion that they are reliable, or that a certain portion of them is reliable, the wrong-way travel may be detected in a further step 160.

Subsequently, in a further step 170, reactions to the detection may occur. This may include passive actions, such as warnings or warning indications to the driver of motor vehicle 11, as well as active actions, such as an intervention in the movement and/or steering of motor vehicle 11.

What is claimed is:

1. A method for determining the plausibility of a wrong-way travel of a motor vehicle when entering a directional roadway, the method comprising:

determining whether the motor vehicle is located in an area of a connection point;

determining at least one time, if the motor vehicle is located in the area of the connection point, whether the motor vehicle is wrongly located in a lane of oncoming traffic;

detecting at least one item of curve information of a current travel path of the motor vehicle;

ascertaining at least one item of curve information of a permitted travel path;

determining a deviation between the detected curve information and the ascertained curve information; and determining the plausibility of a wrong-way travel a limit value for a deviation is breached.

2. The method of claim 1, wherein the curve information includes at least one of a radius, a direction and a course of the curve.

3. The method of claim 1, wherein a detection is made as to whether the motor vehicle is located in a lane of oncoming traffic.

4. The method of claim 1, wherein at least one sensor of the motor vehicle is used for the detection.

5. The method of claim 1, wherein for the ascertainment first a permitted travel path and subsequently at least one item of curve information of the permitted travel path are ascertained.

6. The method of claim 1, wherein the curve information of the permitted travel path is ascertained by the navigation system of the motor vehicle.

7. The method of claim 1, wherein the method is activated in the area of an entrance to the directional roadway.

8. The method of claim 1, wherein at least one of the ascertainment, the determination and the plausibilization is performed in a facility that is external to the motor vehicle.

9. The method of claim 1, wherein the limit value is zero.

10. The method of claim 1, wherein the limit value is non-zero.

11. A control and detection device for determining the plausibility of a wrong-way travel of a motor vehicle when entering a directional roadway, comprising:

a locating arrangement to determine whether the motor vehicle is located in an area of a connection point, and to determine at least one time, if the motor vehicle is located in the area of the connection point, whether the motor vehicle is wrongly located in a lane of oncoming traffic;

a detecting arrangement to detect at least one item of curve information of a current travel path of the motor vehicle;

an ascertaining arrangement to ascertain at least one item of curve information of a permitted travel path;

a determining arrangement to determine a deviation between the detected curve information and the ascertained curve information; and a determining arrangement to determine the plausibility of a wrong-way travel if a a limit value for a deviation is breached.

12. The control and detection device of claim 11, wherein the detection arrangement has at least one image sensor and/or at least one inertial sensor.

13. The control and detection device of claim 11, wherein the limit value is zero.

14. The control and detection device of claim 11, wherein the limit value is non-zero.

15. A method determining a plausibility of a wrong-way travel of a motor vehicle when entering a directional roadway, the method comprising:

determining whether the motor vehicle is located in an area of a connection point;

detecting a least one item of curve information of a permitted travel path;

ascertaining at least one item of curve information of a permitted travel path, wherein the curve information of the permitted travel path is ascertaining by the navigation system of the motor vehicle;

determining a deviation between the detected curve information and the ascertained curve information; and determining the plausibility of a wrong-way travel a when the deviation breaches a limit value.

\* \* \* \* \*